United States Patent [19]
Alex et al.

[11] 3,804,421
[45] Apr. 16, 1974

[54] SOLID MOLDED GOLF BALL

[75] Inventors: Anthony Alex, Akron, Ohio;
Thomas Zawadzki, Princeton, N.J.

[73] Assignee: Alex Incorporated, Akron, Ohio

[22] Filed: June 23, 1972

[21] Appl. No.: 265,497

Related U.S. Application Data

[63] Continuation-in-part of Ser. No. 67,802, Aug. 28, 1970, abandoned, which is a continuation-in-part of Ser. No. 35,237, May 6, 1970, abandoned.

[52] U.S. Cl. ....... 273/218, 260/41.5 R, 260/41.5 A, 273/DIG. 10

[51] Int. Cl. ... A63b 37/00, C08c 11/04, C08d 3/08

[58] Field of Search ................. 260/41.5 R, 41.5 A; 273/218, DIG. 10

[56] References Cited
UNITED STATES PATENTS

| | | | |
|---|---|---|---|
| 2,989,504 | 6/1961 | Little | 260/41.5 R |
| 3,373,123 | 3/1968 | Brice | 260/41.5 A |
| 3,438,933 | 4/1969 | Bartsch | 260/41.5 R |
| 3,478,132 | 11/1969 | Randolph | 260/41.5 A |
| 3,502,338 | 3/1970 | Cox | 260/41.5 R |
| 3,553,159 | 1/1971 | Miller et al. | 260/41.5 A |
| 3,666,272 | 5/1972 | Walker et al. | 273/218 |

*Primary Examiner*—Allan Liberman
*Attorney, Agent, or Firm*—Cushman, Darby & Cushman

[57] ABSTRACT

A homogeneous, solid molded golf ball made from the elastomer cis polybutadiene rubber and containing not more than 15 percent by weight of a cross-linking monomer such as pentaerythritol tetraacrylate under the influence of a free radical initiator such as the peroxide bis (α-t-butylperoxyisopropyl) benzene and in the presence of a monofunctional monomer as a reactive plasticizer is disclosed. The composition optionally includes a co-agent in conjunction with the monofunctional monomer, an impact modifier and an acid acceptor.

17 Claims, 2 Drawing Figures

PATENTED APR 16 1974

3,804,421

INVENTORS
ANTHONY ALEX
THOMAS ZAWADZKI
BY

Cushman, Darby & Cushman
ATTORNEYS

SOLID MOLDED GOLF BALL

This is a continuation-in-part of our application Ser. No. 67,802 filed Aug. 28, 1970, now abandoned, which in turn is a continuation-in-part of our application Ser. No. 35,237 filed May 6, 1970, now abandoned.

BACKGROUND OF THE INVENTION

This invention relates to novel rubber compositions and more particularly to a new and improved solid golf ball molded therefrom.

Present methods of forming a golf ball include the successive steps of winding rubber thread under tension about a core, molding a cover to enclose the rubber-wound core, coating the cover with paint, stamping the cover and coating it with a clear finish coat. In the case of the solid ball, the prior art method of producing an acceptable cover is used with a final clear finish coat. Golf balls made according to the prior art method, as well as the golf balls by other methods, should comply with standards of diameter (not less than 1.680 inches), weight (not greater than 1.620 ounces), and resilience (initial velocity not to exceed 255 feet per second) requirements as established by the United States Golf Association. Other desired properties are uniform roundness and the retention thereof after use, even distribution of the mass throughout the ball providing for an even fly and roll, producing the desired "click" upon impact and rebound characteristics. These characteristics may, of course, be varied by manipulation of the various components of each type ball; however, in order to qualify for tournament play, and practically speaking general marketability of the ball in the United States, the ball must conform to the U.S.G.A. standards as set forth above.

In the case of the wound ball, the prior art methods of producing acceptable golf balls are expensive in that they require a series of steps to complete the product. The core must first be fabricated and then the rubber thread uniformly wound onto the core using a complicated machine of limited capacity; the cover is then applied. The expense of manufacturing a conventional golf ball is great, considering not only the price of the finished product, but the cost of the special machinery required.

In the case of the solid ball, the prior art method of producing an acceptable ball states that two conditions are necessary:

1. the monomer employed must be capable of cross-linking the elastomer and that these monomers must be in the form of di- or higher functional compound, i.e., compounds having two or more readily reacting sites, and
2. the amount of cross-linking monomer must be at least 20 percent by weight of the elastomer to obtain the degree of cross-linking necessary to give the golf ball its acceptable characteristics.

The present invention is directed to a golf ball of a solid, homogeneous rubber composition having the physical, mechanical and aesthetic properties of a conventional golf ball. It is an object of this invention to produce these golf balls using a limited number of manufacturing steps and related equipment in a relatively short period of time. Another object is to produce a solid molded golf ball that complies with the standards established by the United States Golf Association. Another object of this invention is to produce an elastomer rubber composition suitable for molding into a solid golf ball. Another object of this invention is to produce a golf ball which needs less than 15 parts cross-linking monomer in the rubber composition to produce a suitable ball. Another object of this invention is to produce a golf ball which includes not only less than 20 parts cross-linking monomers but can also employ even larger quantities of monofunctional, non-cross-linking monomers that act as reactive plasticizers. Another object of this invention is to produce a high compression golf ball without the use of more than about 14 parts of cross-linking monomer. Another object of this invention is to produce a solid golf ball composition containing N,N'-m-phenylenedimaleimide as a free radical regulator and coagent.

DETAILED DESCRIPTION

Figure 1:
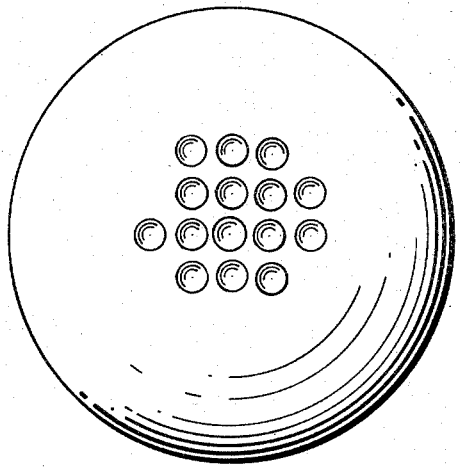
FIG. 1 is a side perspective view of a solid molded golf ball according to the invention.
Figure 2:
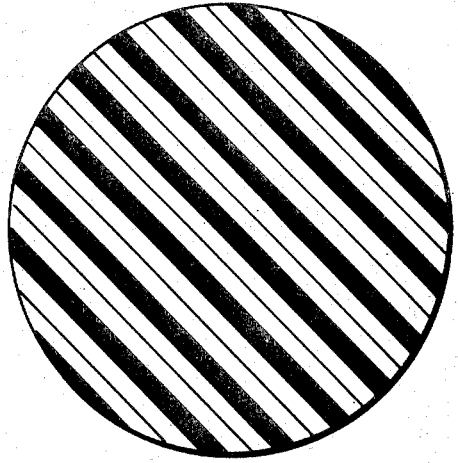
FIG. 2 is a cross-sectional view of a golf ball produced according to the invention.

The composition of the present invention comprises, as its essential ingredient, cis polybutadiene rubber as the elastomer. It is preferred that the cis content be of the order of about 90 percent. Other elastomers such as homo- and copolymers of isoprene, natural rubber, butadiene based elastomers (other than those described above), SBR rubber, EPT rubber and rubber of polychloroprene do not result in a fully satisfactory product. Consequently their use results in a product much inferior to the use of high "cis" polybutadiene rubber.

Several cross-linking agents, sometimes called polyfunctional monomers, are employed to cross-link the rubber and are present to the extent of not more than 15 parts by weight to 100 parts by weight of the elastomer. Suitable cross-linking agents are the pentaerythritol tetramethyacrylate, pentaerythritol tetraacrylate, trimethylolpropane trimethacrylate, trimethylolpropane triacrylate, other di, tri, and tetrafunctional acrylates, and di, tri and tetrafunctional allyl compounds. Superior results have been obtained using pentaerythritol tetraacrylate as sold under the trade name SR–295 by Sartomer Resins, Inc. and trimethylol propane trimethacrylate sold by the same company under the trade name SR–350. While either pentaerythritol tetraacrylate (or methacrylate) or trimethylolpropane trimethacrylate (or triacrylate) can be used alone, preferably a mixture of pentaerythritol and trimethylol derivatives is employed. In such mixture the pentaerythritol tetraacrylate (or methacrylate) is preferably 10 to 50 percent the total of the pentaerythritol and trimethylol compounds.

Bartsch U.S. Pat. Nos. 3,313,545 and 3,438,933 disclose unitary molded golf balls as does the Cox patent 3,502,338. However, balls made in accordance with these patens have a preferred cross-linking monomer range of 25–70 parts per hundred of elastomer. We have surprisingly discovered that golf balls made according to the present invention in which relatively minor amounts of cross-linking monomers which can cross-link the elastomer, themselves, and single functional monomers acting as reactive plasticizers are capable of forming molded golf balls that conform to the specifications established by the U.S.G.A. for golf balls. A preferred cross-linking monomer range is 10–15 parts per hundred of elastomer and a preferred composition contains pentaerythritol tetramethacrylate and/or trimethylol propane trimethacrylate and tetrahydrofurfuryl methacrylate.

Single functional monomers referred to above include, by way of example, tetrahydrofurfuryl methacrylate, cyclohexyl methacrylate and n-hexyl methacrylate. We have also found that a portion of the polyfunctional monomer can be replaced with one or more monofunctional monomers. Preferred is tetrahydrofurfuryl methacrylate sold commercially as SR-203 by Sartomer Resins, Inc.

We have also found that when using both a polyfunctional monomer and a monofunctional monomer as a plasticizer, that when N,N'-m-phenylenedimaleimide, acting as a free radical initiator and co-agent, is included, the resulting composition is an entirely new chemical structure, the crosslinks no longer long and flexible. Generally, when used, from 1 to 20 parts by weight of N,N'-m-phenylenedimaleimide are present, the preferred range being from 5 to 15 parts by weight. N,N'-m-phenylenedimaleimide is sold commercially by DuPont under the trade name HVA-2. When HVA-2 is used in conjunction with trimethylol propane trimethacrylate their sum amounts to between about 10 and about 15 parts per 100 parts of elastomer.

An acid acceptor such as light calcined magnesium oxide is also desirably included in the composition. When present, from 1 to 10 parts by weight are used, preferably about 5 parts. The function of the acid acceptor is to increase the alkalinity of the composition thereby activating the peroxide curing agent. We have found that light calcined magnesium oxide substantially improves the compression of the ball.

A filler material may be required to provide the finished ball with the proper density and weight and to reinforce the composition. Several known fillers commonly used in the rubber compounding art are acceptable according to the present invention. The particular filler should be in a finely divided form. Fillers of the class of silica or silicates serve as an adjunct to the cross-linking reaction. Other suitable fillers are precipitated fine particle silica and alkali metal silicates, such as calcium silicate as well as zinc oxide. Further filler material may be used in addition to or instead of the silica or silicates, such as carbon black, cork, titania, cottom flock, cellulose flock, glass beads, glass micro balloons, leather fiber, plastic fiber, plastic flour, leather flour, fibrous fillers as asbestos, synthetic fibers, metal oxides and talc. The preferred filler is precipitated fine particle hydrated silica (silicon dioxide) sold under the trade name Hi-Sil 233, commonly used as a non-black reinforcing agent in the rubber art.

Inproved results in shatter strength (and consequently improved use life) are obtained when high molecular weight polyethylene is included in the formulation. One such polyethylene is commercially available from Allied Chemical and is sold under the name AC 1221 having a molecular weight of between 1,500,000 and 2,500,000. Suitable polyethylenes for use in the present invention have molecular weights of at least 750,000, preferably 1,000,000 or higher. Balls produced according to the invention containing high molecular weight polyethylene show an improvement in the shatter strength of the resulting balls. Hardness and compression are also improved thereby permitting a greater latitude in formulations to attain the proper "click" and velocity. This is discussed in the U.S. patent to Randolph, No. 3,479,132 as well as suggestions of the use of polypropylene.

We have found that other impact modifiers such as methacrylated butadiene-styrene may be used with advantage to impart improved life and "click" characteristics to the golf ball. Butadiene-styrene copolymers having methacrylate grafted thereon available commercially from Rohm and Haas as Acryloid KM-611 are most suitable. Preferably from 5 to 20 parts are used and most preferably from 10 to 20 parts based on the weight of the elastomer.

Surprisingly, it has been discovered that the flow characteristics of the compound when used in transfer molding have been improved by the addition of glass particles or microballons, such as glass bubbles as manufactured by 3M or Emerson and Cuming, Inc., and expanded volcanic glass known as Corcel 46 made by Interpace Corporation. The amount of glass particles when introduced into the formula varies from about 1 to about 30 parts of the composition, 10 parts being the preferred amount. Of course, a golf ball of suitable characteristics can be made according to the present invention in the complete absence of glass particles. These glass spheres appear in a variety of configurations, as individual spheres, clusters somewhat like grapes or soap suds and even parts of spheres. The addition of glass spheres to the compound reduces the specific gravity of the resulting golf ball, facilitates molding, particularly transfer molding, and increases the golf ball compression number of the finished product.

A curing agent such as a peroxide is used to cure the present formulation. These curing agents are polymerization catalysts of the free radical type and are capable of causing the cross-linking of the curing agent or monomer in order to further polymerize and cross-link the product. Peroxide curing agents are readily commercially available and may be selected from the following products: m-bis($\alpha$-t-butylperoxyisopropyl) benzene, sold as Vul Cup KE 40; dicumyl peroxide, sold as Di-cup 40C, both by Hercules Chemial; and 2,5-Dimethyl-2,5-bis(t-butyl peroxy) hexyne-3 sold by Wallace and Tiernan, Inc., as Lucidol 130; and Percadox 29/40 which is 40 percent, 1,1 Di-tertiary butylperoxy 3,3,5-trimethyl cyclohexane on calcium carbonate and Percadox 17/40 which is 40 percent n-butyl-4,4-Bis(t-butylperoxy) valerate, both sold by Chemetross-Nowry. Other peroxide or peroxys that may be used are 2,4-dichloro-benzoly peroxide (50 percent active with 50 percent inert filler) and 2,5-dimethyl-2,[5-di(t-butyl-peroxy)]hexane (45 percent mix 55 percent inert filler. The above products are all well known in the art for curing rubbers and acrylic monomers.

A pigment or pigments are commonly added to rubber compositions. The desired tournament golf ball is white; accordingly, titanium dioxide is the preferred pigment. Other pigments may also be used such as barium sulfate, zinc sulfide, barium carbonate, lithopone, titanium dioxide with barium base, titanium dioxide with calcium base, titanium dioxide with aluminum silicate, white lead, calcium carbonate and aluminum oxide.

The homogeneous material of the present invention comprises a cured blend of the following ranges of materials based by weight on 100 parts of elastomer:

| | Parts |
|---|---|
| cis polybutadiene rubber | 100 |
| SiO₂ reinforcing agent | 0-50 |
| titanium dioxide | 0-5 |
| light magnesium oxide | 0-10 |
| peroxide curing agents | 2-10 |
| polyfunctional monomers | 5-15 |
| monofunctional monomers | 5-50 |
| polyethylene | 0-20 |
| glass spheres | 0-30, usually at least 1 |
| methacrylated butadiene-styrene impact modifier | 0-20 |
| inside cross-link modifier | 0-20 |

Where present, at least about 1 part of the material is used based on 100 parts by weight of elastomer.

According to the above formula, a very suitable golf ball was made conforming to the present U.S.G.A. regulations using from 5 to 15 parts of an acrylate cross-linking agent. In using amounts of cross-linking agent in the range of about 5 to 15 parts per 100 parts of rubber, increased rebound and more stable flight characteristics were experienced as compared to levels on the order of 35 parts, for example.

A monomeric methacrylate monomer was included in the above formulation in order to add plasticity to the uncured composition when used in molding. Methacrylates or acrylates of high molecular weight and low volatilities such as tetrahydrofurfuryl methacrylate or acrylate can be employed and are considered to act as reactive plasticizers.

The golf balls produced according to the present invention are carefully molded and examined for conformity to U.S.G.A. standards. In addition to the physical dimensions of the ball, the compression of the ball as measured on a standard golf ball compression test machine should be between 40 and 150 points and preferably between 50 and 100 points. The balls will preferably bounce between about 50 to 75 inches when dropped from a height of 100 inches in accordance with the standard bounce test, thereby giving a direct percentage of rebound reading.

The selected ingredients are blended to form a homogeneous mass on an open mill or in a Banbury mixer at ambient temperatures, or temperatures at least below that at which the cis polybutadiene rubber composition begins to cure. Other known methods of mixing may also be satisfactorily used. Following mixing into a homogeneous mass, the material can be extruded, cut into predetermined lengths, compression molded and cured into a spherical, dimpled golf ball. As alternatives, the material can be fed into a screw injection molding machine and injected into a dimpled mold or transferred mold. The preferred method of molding the finished article is by transfer molding.

Unless otherwise indicated, all parts and percentages are by weight. The following examples are given by means of illustration and are not to be considered as limiting the invention.

EXAMPLES 1

A composition of the following materials was mixed to a homogeneous mass in a Banbury mixer at about 250°F:

| | Parts |
|---|---|
| cis, polybutadiene rubber 90% cis | 100 |
| fine, precipitated silicon dioxide | 30 |
| light magnesium oxide | 5 |
| zinc oxide | 5 |
| titanium dioxide | 2 |
| m-bis( -t-butylperoxyisopropyl) benzene | 3.5 |
| tetrahydrofurfuryl methacrylate | 20 |
| pentaerythritol tetraacrylate | 12.5 |

After complete mixing, the homogeneous mixture was weighed and placed into the pot of a transfer mold. Pressure was placed on the molding compound, forcing it into the spherical dimpled mold. The ball was cured for 30 minutes at 320°F. The molded article was removed and the sprue trimmed. The resulting golf ball had the following physical characteristics:

| | |
|---|---|
| Golf Ball compression | 57 |
| Rebound | 77.4% |
| Compression to break (PSI) | 8,000 |

By means of comparison, a conventional rubber wound tournament ball would have a compression of from 60 to 90, or even as much as 100, and a rebound of approximately 74 percent.

The ball thus produced had a diameter greater than 1.680 inches and weighed less than 1.620 ounces.

EXAMPLE 2

A composition was prepared in a similar manner to that of Example 1 except for the addition of 10 parts of glass bubbles to the formulation prior to mixing. The resulting homogeneous mass was weighed and subjected to transfer molding. Measured in the same manner as Example 1, the resulting golf ball containing glass microballons gave the following physical characteristics:

| | |
|---|---|
| Golf ball compression | 70 |
| Rebound | 75% |
| Compression to break (PSI) | 11,000 psi |

It was concluded that the addition of glass bubbles to the rubber composition not only improved the flow characteristics in the transfer mold but substantially increased the compression of the resulting golf ball.

EXAMPLE 3

A composition of the following materials was mixed in a Banbury mixer until a homogeneous mass was obtained:

| | Parts |
|---|---|
| cis polybutadiene rubber, 90% cis | 100 |
| fine, precipitated silicon dioxide | 30 |
| light magnesium oxide | 5 |
| zinc oxide | 5 |
| titanium dioxide | 2 |
| m-bis(α-t-butylperoxyisopropyl) benzene | 3.5 |

|  | Parts |
|---|---|
| pentaerythritol tetraacrylate | 12.5 |
| tetrahydrofurfuryl methacrylate | 20 |
| high molecular weight polyethylene | 15 |

A quantity of the above formulation was transfer molded and heated at 320°F. in the mold for about 30 minutes, then removed and trimmed. The resulting product had the following parameters:

| Golf ball compression | 67 |
|---|---|
| Rebound | 77% |
| Compression to break (PSI) | 8,000 psi |
| Weight | 1.618 ounces |
| Diameter | 1.682 inches |

EXAMPLE 4

A composition similar to that of Example 3 was prepared but also 10 parts of glass bubbles were added to the formulation. The resulting product was found to have the following parameters:

| Golf ball compression | 77 |
|---|---|
| Rebound | 75% |
| Compression to break (PSI) | 11,000 |
| Weight | 1.618 ounces |
| Diameter | 1.680 inches |

EXAMPLE 5

A composition of the following materials was mixed to a homogeneous mass on an open mill:

|  | Parts |
|---|---|
| cis polybutadiene rubber (90% cis) | 100 |
| fine, precipitated silicon dioxide | 30 |
| titanium dioxide | 2 |
| magnesium oxide | 5 |
| m-bis-(α-t-butylperoxyisopropyl) | 3.5 |
| tetrahydrofurfuryl methacrylate | 20 |
| pentaerythritol tetraacrylate | 12.5 |

After complete mixing, the homogeneous mixture was weighed and placed into molding machine with spherical dimpled mold. The ball was then cured for 30 minutes at 320°F. The molded article was removed. The resulting golf ball had the following physical characteristics:

| Compression U.S.G.A. | 57 |
|---|---|
| Rebound | 76.4% |
| Compression to break (PSI) | 8,000 |

By means of comparison, a conventional rubber wound tournament ball would have a compression of from 60 to 90, or even as much as 100, and a rebound of approximately 74 inches.

The ball thus produced had a diameter greater than 1.680 inches and weighed not less than 1.620 ounces.

EXAMPLES 6-10

Compositions of the following materials measured in parts by weight listed in Table A were mixed in the manner of Example 5 to homogeneous masses on an open mill and cured for 10 minutes at 340°F. in a golf ball mold.

TABLE A

| Example | 6 | 7 | 8 | 9 | 10 |
|---|---|---|---|---|---|
| cis polybutadiene rubber | 100.00 | 100.00 | 100.00 | 100.00 | 100.00 |
| silica filler (fine) | 30.00 | 30.00 | 30.00 | 30.00 | 10.00 |
| light magnesium oxide | 5.00 | 5.00 | 5.00 | 5.00 | 5.00 |
| titanium dioxide | 2.00 | 2.00 | 2.00 | 2.00 | 2.00 |
| Vul Cup 40 KE | 3.50 | 3.50 | 3.50 | 3.50 | 3.50 |
| SR-295 | 12.50 | 12.50 | 12.50 | 12.50 | 0.00 |
| SR-203 | 20.00 | 30.00 | 40.00 | 50.00 | 20.00 |
| high molecular weight polyethylene (AC1221) | 15.00 | 15.00 | 15.00 | 15.00 | 0.00 |

The results obtained from the above formulations of Examples 6 to 10 are given in Table B:

TABLE B

| Example | 6 | 7 | 8 | 9 | 10 |
|---|---|---|---|---|---|
| Golf ball compression | 57 | 53 | 43 | 34 | 0 |
| % rebound | 77 | 74.5 | 72.5 | 70.5 | 83.5 |
| Compression to break (PSI) | 8,000 | 10,000 | 12,000 | 10,000 | no break |
| Diameter greater than 1.680 inches | Yes | Yes | Yes | Yes | Yes |
| Weight less than 1.620 ounces | Yes | Yes | Yes | Yes | Yes |

From the above examples it can be seen that the SR-203 (tetrahydrofurfuryl methacrylate) monomer acts as a plasticizer and not as a cross-linking agent. KM-611 may be substituted in equal amounts for the AC1221 to produce similar results.

EXAMPLE 11

A composition of the followng materials were mixed to a homogeneous mass on an open mill and cured in golf ball mold for 10 minutes at 340°F.

| MATERIALS | Parts |
|---|---|
| cis polybutadiene rubber | 100.00 |
| fine particle silica | 30.00 |
| light magnesium oxide | 5.00 |
| titanium oxide | 2.00 |
| Percadox 29/40 | 1.20 |
| Di Cup 40C | 4.50 |
| SR-295 | 3.50 |
| SR-350 (trimethylolpropane trimethacrylate) | 11.25 |
| SR-203 | 18.00 |
| high molecular weight polyethylene (AC1221) | 15.00 |

Results obtained from the above formulation on the cured ball are:

| RESULTS | |
|---|---|
| Golf ball compression | 63 |
| % rebound | 74 |
| Compression to break (PSI) | 13,500 |
| Diameter greater than 1.680 inches | Yes |
| Weight less than 1.620 ounces | Yes |

The results of this example show that the combination of polyfunctional monomers and peroxide curing agents result in a further improvement over the basic formula in Example 5.

EXAMPLE 12

A composition of the following materials were mixed to a homogeneous mass on an open mill and cured in a golf ball mold for 10 minutes at 340°F.

| MATERIALS | PARTS |
|---|---|
| cis polybutadiene rubber | 100 |
| Hi-Sil 233 | 30 |
| light calcined magnesium carbonate | 5 |
| titanium dioxide | 2 |
| Vul Cup 40 KE | 3.5 |
| SR-295 | 12.5 |
| SR-203 | 50 |
| AC1221 | 15 |

Results obtained from the above formulation on the cured ball are:

| RESULTS | |
|---|---|
| Golf ball compression | 34 |
| % rebound | 70.5 |
| PSI in compression to break | 10,000 |

Referring to Examples 6-9, it will be further apparent that the amount of SR-203 plasticizer increases from 20 to 30 up to 50 parts, compression and percent rebound decrease. However, PSI compression to break decreases from 12,000 to 10,000 when the amount of SR-203 is increased from 40 to 50 parts. This indicates that the tetrahydrofurfuryl methacrylate acts as a plasticizer.

EXAMPLES 13-18

The following Examples are in the manner of Example 5, the compositions being mixed and cured in a golf ball mold for 10 minutes at 340°F. These examples show the systematic inclusion of various components of the molding composition and the results obtained from the golf balls molded therefrom.

| Example | 13 | 14 | 15 | 16 | 17 | 18 |
|---|---|---|---|---|---|---|
| Cis polybutadiene | 100.0 | 100.0 | 100.0 | 100.0 | 100.0 | 100.0 |
| Hi-Sil 233 | 30.0 | 30.0 | 30.0 | 30.0 | 30.0 | 30.0 |
| Vul Cup 40 KE | 4.0 | 4.0 | 4.0 | 4.0 | 4.0 | 4.0 |
| SR-203 | 20.0 | 20.0 | 20.0 | 20.0 | 20.0 | 20.0 |
| SR-350 | | 15.0 | 15.0 | 15.0 | 15.0 | 15.0 |
| Light calcined magnesium oxide | | | 5.0 | 5.0 | 5.0 | 5.0 |
| Zinc Oxide | | | | 3.0 | 3.0 | 3.0 |
| KM-611 | | | | | 15.0 | 15.0 |
| Percadox 17/40 | | | | | | 1.2 |
| Results | | | | | | |
| Compression | 0 | 29 | 39 | 42 | 55 | 65 |
| % Rebound | 78.7 | 78.1 | 76.8 | 76.8 | 75.0 | 72.5 |
| Break (PSI) | 7,000 | 8,500 | 8,500 | 9,500 | 10,000 | 9,500 |

From the above results, it will be apparent that the compression rather dramatically improves with the use of light calcined magnesium oxide in Examples 15-18 and Percadox 17/40 in Example 18. Note also the increase of about 10 points in compression between Examples 16 to 18. Compositions of Examples 17 and 18 or combinations thereof produce a highly satisfactory ball and are preferred.

EXAMPLE 19

Using the method of Example 5, an outstanding golf ball is prepared by molding the following composition:

| MATERIALS | PARTS |
|---|---|
| Cis polybutadiene | 100.0 |
| Hi-Sil 233 | 30.0 |
| Light calcined magnesium oxide | 5.0 |
| Zinc oxide | 5.0 |
| Titanium dioxide | 1.0 |
| Vul Cup 40 KE | 4.0 |
| Percadox 17/40 | 0.6 |
| SR-203 | 20.0 |
| SR-350 | 7.0 |
| HVA-2 | 6.0 |
| KM-611 | 15 |
| Results | |
| Compression | 69 |
| % Rebound | 73.1 |
| Compression to break (PSI) | 9,500 |

The ratio of HVA-2 to SR-350 may be varied, as previously pointed out, provided that the sum of the two ingredients does not exceed 15 parts by weight. Variation of this ratio will, of course, alter the physical characteristics of the ball.

The above specification describes the invention in detail with reference to specific embodiments. Various changes and modifications which fall within the spirit of the invention and the scope of the appended claims will become apparent to one skilled in the art.

What is claimed is:

1. A solid homogeneous golf ball having the physical, mechanical and aesthetic properties of a conventional golf ball molded from an elastomeric cross-linked rubber composition consisting essentially of 100 parts of polybutadiene rubber, at least 90 percent thereof being cis polybutadiene, about 5 to 15 parts of a polyfunctional monomer which is pentaerythritol tetraacrylate, pentaerythritol tetramethacrylate, trimethylolpropane trimethacrylate or trimethylolpropane triacrylate, about 1 to 75 parts of a monofunctional monomer which is tetrahydrofurfuryl acrylate or tetrahydrofurfuryl methacrylate, at least 10 parts finely divided silica or silicates, up to 10 parts of an acid acceptor and a catalytic amount of a free radical initiator as a curing agent.

2. A homogeneous golf ball according to claim 1 wherein the polyfunctional monomer is pentaerythritol tetraacrylate or pentaerythritol tetramethacrylate.

3. A homogeneous solid golf ball according to claim 1 wherein the composition contains (1) pentaerythritol tetraacrylate or pentaerythritol tetramethacrylate and (2) trimethylolpropane trimethacrylate or trimethylolpropane triacrylate as the sole polyfunctional monomers.

4. A homogeneous golf ball according to claim 1 molded from a mixture consisting essentially of 100 parts of cis polybutadiene rubber, 5 to 15 parts of at least one of pentaerythritol tetraacrylate or pentaerythritol tetramethacrylate, trimethylolpropane trimethacrylate or trimethylol triacrylate, 10 to 50 parts silica, 1 to 50 parts tetrahydrofurfuryl acrylate or tetrahydrofurfuryl methacrylate, up to 5 parts light magnesium oxide as the acid accepter, from 0.5 to 5 parts titanium dioxide, and 1 to 10 parts of a peroxide curing agent.

5. A solid homogeneous golf ball having the physical, mechanical and aesthetic properties of a conventional golf ball molded from an elastomeric cross-linked rubber composition consisting essentially of 100 parts of polybutadiene rubber, at least 90 percent thereof being cis polybutadiene, about 5 to 15 parts of a polyfunctional monomer selected from the group consisting of pentaerythritol tetraacrylate, pentaerythritol tetramethacrylate, trimethylolpropane trimethacrylate and trimethylolpropane triacrylate, about 5 to 50 parts of a monofunctional monomer selected from the group consisting of tetrahydrofurfuryl acrylate or tetrahydrofurfuryl methacrylate, 0 to 20 parts of N,N'-m-phenylenedimaleimide, 1 to 50 parts of silica or a silicate, up to 10 parts of an acid acceptor and a catalytic amount of free radical initiator as a curing agent.

6. A homogeneous golf ball according to claim 5 wherein said acid acceptor is light calcined magnesium oxide.

7. A homogeneous golf ball according to claim 5 including about 1 to 20 parts of N,N'-m-phenylenedimaleimide.

8. A homogeneous golf ball according to claim 5 including about 1 to 10 parts of light calcined magnesium oxide, as the acid acceptor, and about 1 to 20 parts of N,N'-m-phenylenedimaleimide.

9. A homogeneous golf ball according to claim 5 including about 1 to 20 parts of a methacrylated butadiene-styrene graft copolymer as an impact modifier.

10. A homogeneous golf ball according to claim 5 including N,N'-m-phenylenedimaleimide, wherein said polyfunctional monomer is trimethylolpropane trimethacrylate and where the sum of N,N'-m-phenylenedimaleimide and trimethylolpropane trimethacrylate is about 10–15 parts.

11. A solid homogeneous golf ball having the physical, mechanical and aesthetic properties of a conventional golf ball molded from an elastomeric cross-linked rubber composition comprising 100 parts of polybutadiene rubber, at least 90 percent thereof being cis polybutadiene, about 5 to 15 parts of a polyfunctional monomer which is pentaerythritol tetraacrylate, pentaerythritol tetramethacrylate, trimethylolpropane trimethacrylate or trimethylolpropane triacrylate, about 10 to 30 parts of a monofunctional monomer which is tetrahydrofurfuryl acrylate or tetrahydrofurfuryl methacrylate, a catalytic amount of a free radical initiator as a curing agent, from 1 to 50 parts of finely divided silica and from 3 to 7 parts of light calcined magnesia.

12. A homogeneous golf ball according to claim 11 wherein said catalyst is (a) m-bis( -t-butylperoxyisopropyl) benzene, and (b) n-butyl-4,4-Bis(t-butylperoxy)valerate, the sum of (a) and (b) being about 0.1 to 6.0 parts.

13. A homogeneous golf ball according to claim 11 wherein said polyfunctional monomer is a mixture of trimethylolpropane trimethacrylate and about 10 to 14.9 parts of N,N'-m-phenylenedimaleimide, provided that their sum does not exceed 15 parts.

14. A homogeneous golf ball according to claim 11 including about 1 to 20 parts of N,N'-m-phenylenedimaleimide.

15. A homogeneous golf ball according to claim 1 further including about 1 to 20 parts of a methacrylated butadiene-styrene graft copolymers as an impact modifier and compression modifier.

16. A solid homogeneous golf ball having the physical, mechanical and aesthetic properties of a conventional golf ball molded from a composition wherein the sole polymers and polymerizable materials are, based on parts by weight, cis polybutadiene rubber having at least a 90 percent cis content, about 100 parts; trimethylolpropane trimethacrylate, from about 5 to about 15 parts; tetrahydrofurfuryl methacrylate, about 1 to about 50 parts; N,N'-m-phenylenedimaleimide, about 1 to 20 parts; and methacrylated butadiene-styrene graft copolymer, about 1 to about 20 parts and also including from 1 to 10 parts of an acid acceptor and 1 to 50 parts of finely divided silica.

17. A golf ball according to claim 16 wherein said composition includes light calcined magnesium oxide, as said acid acceptor, from about 1 to about 10 parts; and also includes zinc oxide, from about 0.1 to about 10 parts; titanium dioxide from about 0.1 to about 5 parts; and a methacrylated butadiene-styrene graft copolymer, from about 0.1 to about 20 parts.

* * * * *